Aug. 24, 1926.                                            1,597,578
                    W. BURKE
                     SICKLE
              Filed July 16, 1924      2 Sheets-Sheet 2
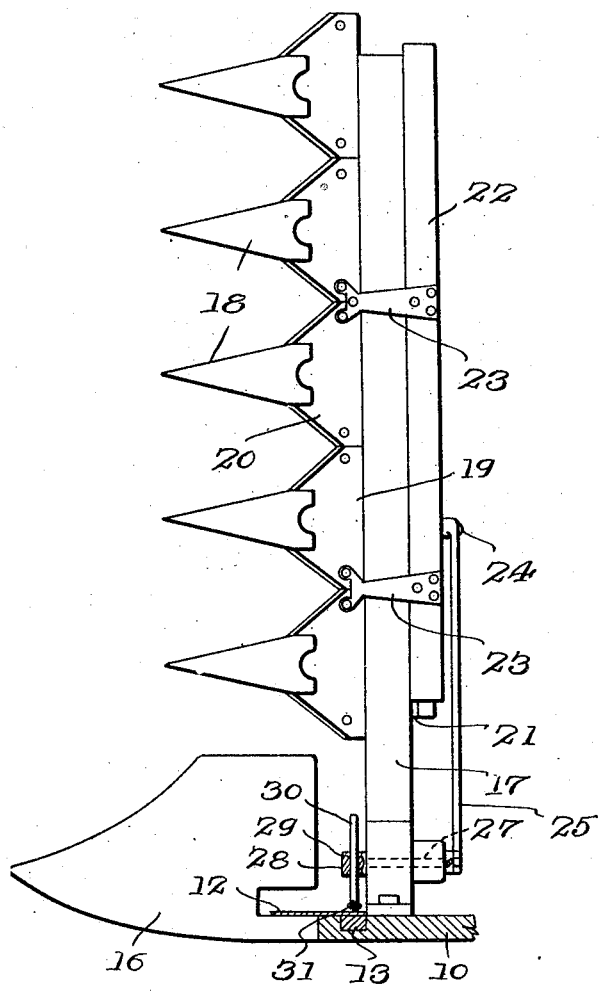
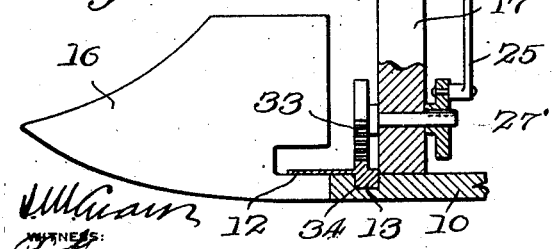
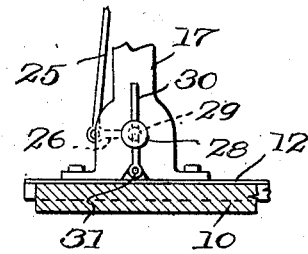
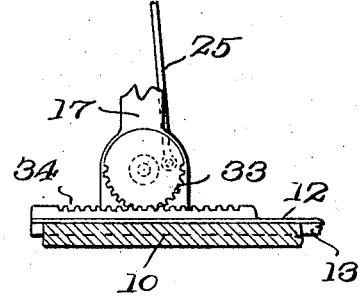
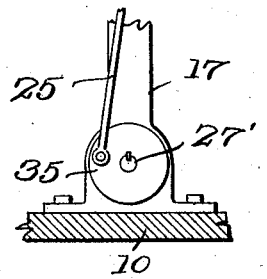
William Burke
INVENTOR
BY Victor J. Evans
ATTORNEY Patented Aug. 24, 1926.

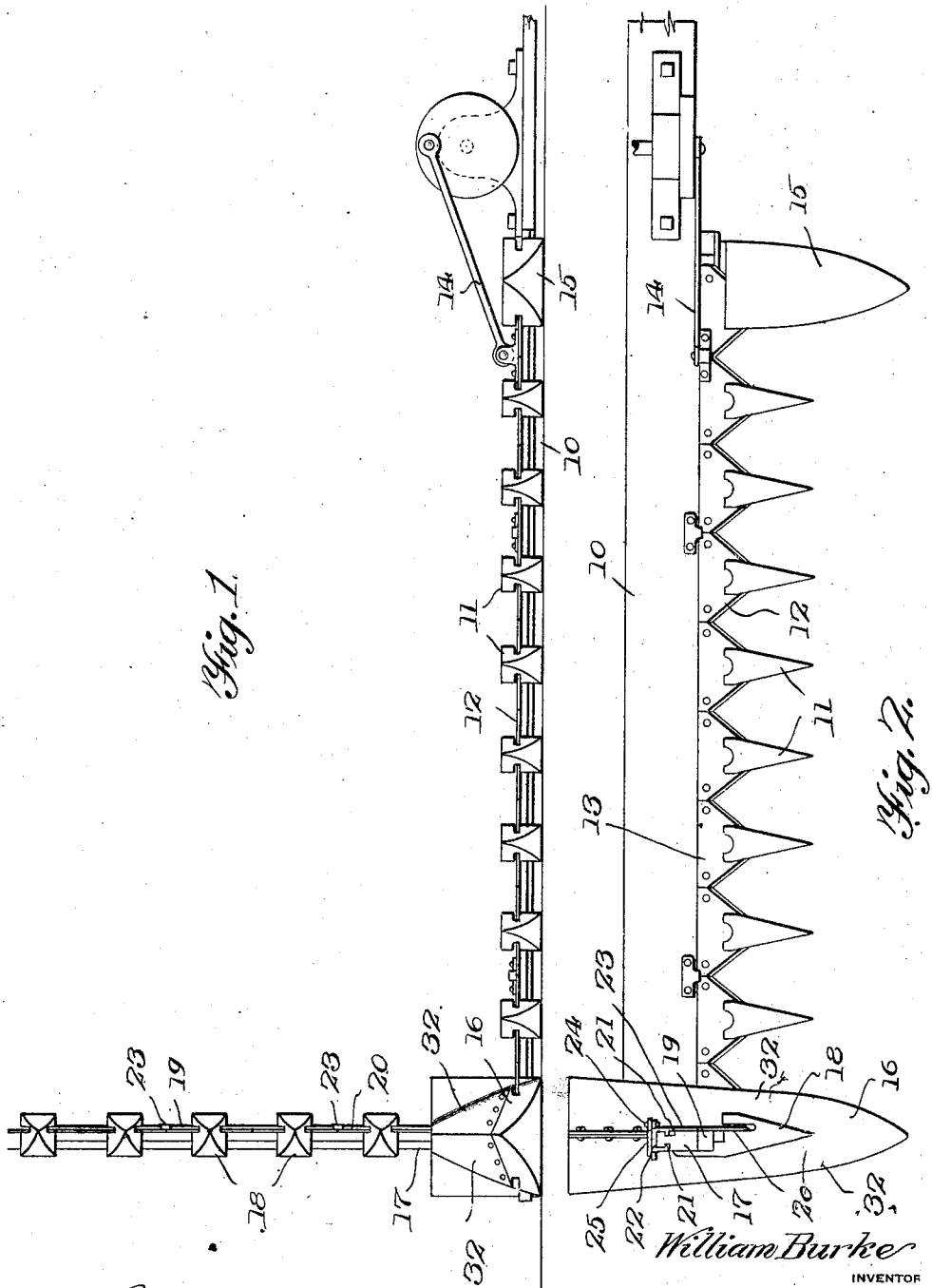

1,597,578

UNITED STATES PATENT OFFICE.

WILLIAM BURKE, OF LEWISTON, MINNESOTA.

SICKLE.

Application filed July 16, 1924. Serial No. 726,363.

This invention relates to improvements in harvesting machines and has for an object the provision of a vertically arranged auxiliary cutting mechanism, which may be attached to the cutting mechanism of a mower or binder.

Another object of the invention is the provision of novel means whereby power from the ordinary horizontally arranged cutting mechanism may be transferred to the vertically arranged or auxiliary cutting mechanism, so that the sickle of the latter will be operated by the sickle of the former.

With the above and other objects in view, the invention further includes the following novel features and details of construction, to be hereinafter more fully described, illustrated in the accompanying drawings and pointed out in the appended claims.

In the drawings:—

Figure 1 is a front elevation of the invention.

Figure 2 is a plan view.

Figure 3 is an enlarged section taken transversely of the horizontal sickle with the cover of the outer shoe removed.

Figure 4 is an enlarged fragmentary vertical longitudinal section taken transversely of the outer shoe and showing the means for operating the vertical sickle.

Figure 5 is a view similar to Figure 3 showing a modified form of the invention.

Figure 6 is a view similar to Figure 4 and illustrating the form of the invention shown in Figure 5.

Figure 7 is a rear elevation of the subject matter of Figures 5 and 6.

Referring in detail to the drawings, wherein like characters of reference denote corresponding parts, the finger bar of the horizontal cutting mechanism is indicated at 10 and carries the usual spaced fingers 11, through which the knives 12 of the sickle bar 13 operate in the usual manner. The sickle bar is reciprocated from the mower or binder mechanism in any preferred manner, such for example as by a pitman 14 which has one end pivotally connected to the sickle bar 13 and its opposite end connected to suitable operating mechanism.

The inner shoe of the horizontal cutting mechanism is indicated at 15, while the outer shoe is shown at 16 and extending upwardly from this last mentioned shoe and carried by the finger bar 10 is a vertically arranged finger bar 17 which carries spaced fingers 18. The finger bar 17 provides a guide for a vertically disposed reciprocatory sickle bar 19 which carries knives 20, the latter operating through the fingers 18 after the manner of the horizontal sickle.

The rear edge of the finger bar 17 is provided with oppositely disposed grooves 21 which form guides for a slide 22 and the latter is connected to the sickle bar 19 by means of spaced arms 23. Pivotally connected to the slide 22 as shown at 24, is one end of a pitman 25. The opposite end of this pitman is pivotally connected to a crank arm 26 which is secured upon one end of a rock shaft 27, the latter being mounted in a suitable bearing carried by or forming a part of the finger bar 17. The opposite end of the rock shaft 27 carries an enlargement 28 which has an opening 29 therein and slidingly mounted within this opening is a bar 30. The inner end of the bar 30 is pivotally secured to the sickle bar 13 as shown at 31, so that when the last mentioned sickle bar is reciprocated by the mower mechanism, the rock shaft 27 will be oscillated to impart an oscillating movement to the crank arm 26 and this movement will, through the pitman 36 impart a reciprocatory movement to the sickle bar 19.

The operating mechanism which connects the sickle bars 13 and 19 may be protected by a housing which includes plates 32, which are removably secured to the outer shoe 16.

In Figures 5 to 7 of the drawings, there is illustrated a modified form of mechanism for transferring motion from the sickle 13 to the sickle 19. This consists of a rock shaft 27' which is mounted in a bearing provided in the finger bar 17 and which has secured upon one end a gear 33 whose teeth engage a rack 34 provided in the upper face of the sickle bar 13. The opposite end of the rock shaft 27' has secured thereon a disk 35 to which one end of the pitman 25 is pivotally secured.

Reciprocatory motion imparted to the sickle bar 13 will, through the rack 34 and the gear 33 engaged therewith, rock the shaft 27' so as to oscillate the disk 35 and through the pitman 25 impart a reciprocatory movement to the sickle bar 19.

The invention is susceptible of various changes in its form, proportions and minor details of construction and the right is herein reserved to make such changes as properly fall within the scope of the appended claims.

Having described the invention what is claimed is:—

1. In a mower, a main sickle, a supplemental sickle located substantially at right angles to the main sickle, means whereby the main sickle may be operated, a rock shaft, a bar having one end pivotally secured to the main sickle, a sliding connection between the opposite end of said bar and the rock shaft, a crank arm secured to the rock shaft and a pitman connecting the crank arm to the auxiliary sickle, whereby operation of the main sickle will operate the auxiliary sickle.

2. In a mower, a main sickle, a supplemental sickle located substantially at right angles to the main sickle, means to operate the main sickle, a rock shaft having an opening therein, a bar having one end pivotally secured to the main sickle and its opposite end slidable within the opening of the rock shaft, a crank arm secured to the rock shaft and a pitman connecting the crank arm to the auxiliary sickle whereby operation of the main sickle will operate the auxiliary sickle.

In testimony whereof I affix my signature.

WILLIAM BURKE.